United States Patent [19]

Steckle et al.

[11] Patent Number: 5,215,442
[45] Date of Patent: Jun. 1, 1993

[54] TURBINE BLADE PLATFORM DAMPER

[75] Inventors: Charles E. Steckle, Loveland; Philip W. Dietz, Cincinnati; Kenneth Willgoose, West Chester, all of Ohio

[73] Assignee: General Electric Company, Cincinnati, Ohio

[21] Appl. No.: 770,839

[22] Filed: Oct. 4, 1991

[51] Int. Cl.⁵ .............................................. F01D 5/22
[52] U.S. Cl. ..................................... 416/248; 416/500; 29/889.71
[58] Field of Search ............... 416/248, 500, 144, 190, 416/191; 29/889.71

[56] References Cited

U.S. PATENT DOCUMENTS

| | | | |
|---|---|---|---|
| 3,847,506 | 11/1974 | Straniti | 416/500 |
| 4,084,922 | 4/1978 | Glenn | 416/248 |
| 4,917,574 | 4/1990 | Dodd et al. | 416/500 |

FOREIGN PATENT DOCUMENTS

| | | | |
|---|---|---|---|
| 335299 | 10/1989 | European Pat. Off. | 416/500 |
| 2302251 | 8/1973 | Fed. Rep. of Germany | 416/144 |
| 1113109 | 3/1956 | France | 416/500 |
| 1204858 | 8/1959 | France | 416/500 |
| 660207 | 3/1987 | Switzerland | 416/500 |
| 730536 | 5/1955 | United Kingdom | 416/500 |

*Primary Examiner*—John T. Kwon
*Attorney, Agent, or Firm*—Jerome C. Squillaro; John R. Rafter

[57] ABSTRACT

A vibration damper for rotor blades of a gas turbine engine has a shaft and a contact head connected thereto. The shaft is slidably inserted in a cylindrical recess incorporated in the rotor blade platform. During rotation of the rotor disk, the shaft of the damping member slides along the shaft axis, whereby the damping member is moved at least in the radial and circumferential directions by centrifugal forces. The contact head of the damping member of one rotor blade finally bears against the platform portion of an adjacent rotor blade, serving to damp vibratory motion of both blades.

19 Claims, 4 Drawing Sheets

TURBINE BLADE PLATFORM DAMPER

FIELD OF THE INVENTION

This invention relates generally to rotors of turbines and compressors in a gas turbine engine. Specifically, the invention relates to an improved mechanism for damping vibrations in compressor or turbine blades of a gas turbine aircraft engine.

BACKGROUND OF THE INVENTION

A gas turbine aircraft engine comprises three primary components: the compressor, combustor and turbine. Air enters the gas turbine engine at the engine inlet and flows from there into the compressor. Compressed air flows to the combustor where it is mixed with injected fuel and the fuel-air mixture is ignited. The hot combustion gases flow through the turbine. The turbine extracts energy from the hot gases, converting it to power to drive the compressor and any mechanical load connected to the drive.

Both the compressor and the turbine consist of a plurality of stages. Each stage is comprised of a rotating multi-bladed rotor and a nonrotating multi-vane stator. Each vane and blade are of airfoil section.

The present invention is a mechanism incorporated in each of the blades of one or more rotor stages. The blades of the rotor are circumferentially distributed on a disk for rotation therewith about the disk axis. As shown in FIG. 1A, a conventional rotor blade 10 has a root or dovetail portion 16 (shown in its as cast condition before machining) which is slidably received in a complementarily configured recess (not shown) provided in the rotor disk, a platform portion 14 located outside the rotor disk and an airfoil portion 12 extending radially outwardly from the platform.

The platforms collectively define a radially outwardly facing wall of an annular gas flow passageway through the engine. The airfoils of the rotor blades extend radially into the passageway to interact aerodynamically with the gas flow therethrough.

These airfoils are subject to fatigue due to vibrations even though the angular speeds are low, for example, 4,000 rpm. It is necessary to damp such vibrations to reduce the fatigue on the blades, particularly at or near resonant frequencies.

Various types of blade dampers are known. For example, in a shroud-type damper, the distal ends of adjacent airfoils are physically connected to one another. This design has the disadvantage that the damper increases the mass of the rotor at the greatest radial distance and may interfere with gas flow through in the passageway.

Another known type consists of so-called under-platform dampers which generally have a movable member positioned between the rotor disk and the underside of the platform of one or more turbine blades. Upon rotation of the turbine, the member is displaced radially outwardly by centrifugal forces to engage the undersides of adjacent blades and thereby perform perform a damping function.

In yet another type of damper, a member is positioned between the platforms of adjacent blades. In accordance with the teaching of U.S. Pat. No. 2,912,223 to Hull, a spring-like member arranged between the platforms of adjacent blades is used to damp vibrations of the blades and seal the gap between adjacent platforms. U.S. Pat. No. 4,497,611 to Keller teaches an axial flow turbine wherein a wedge-shaped member is axially displaced by an axial pressure difference, whereby turbine blade vibration is damped.

In accordance with the teaching of U.S. Pat. No. 4,872,812 to Hendley et al., vibration damping and gap sealing are provided by elongated inserts of triangular cross section loosely received within pockets at the spacing gaps between between opposing convex and concave airfoil side edges of adjacent blade platforms. The inserts and pockets are relatively configured to provide self-orientation of the inserts into gap sealing and vibration damping engagement with the platform edges when acted upon by centrifugal forces due to rotor rotation.

An improved vibration damper for a turbine rotor blade was disclosed in U.S. Pat. No. 4,936,749 to Arrao et al. A U-shaped wire-form damping member has its legs respectively slidably received in a pair of inclined recesses which extend into the platform portion of the blade and toward the root portion. When the rotor disk is rotated at a sufficiently great angular speed, the damping members move outwardly due to the centrifugal force acting thereon to engage the opposing surface of the adjacent blade platform. When so engaged, the members damp vibrations of such blades and seal the space between the opposing platform surfaces.

SUMMARY OF THE INVENTION

An object of the present invention is to improve upon the prior art mechanisms for damping vibration in a rotor. In particular, it is an object of the invention to provide a mechanism whose damping effect can be localized to the specific portion of the hardware which is undergoing undesirable vibratory motion.

Another object of the invention is to provide a platform damper that is able to damp radial motion associated with torsional vibratory modes of slender, high-aspect-ratio low-pressure turbine blades having platforms overhanging the root or dovetail.

A further object of the invention is to provide a damping mechanism which is self-retained in the rotor blade.

Yet another object of the invention is to provide a damping mechanism which is hidden in the platform portion of a rotor blade, thereby eliminating windage loss.

Also it is an object of the invention to provide a damping mechanism which can be easily and economically retrofitted into existing hardware.

A further object of the invention is to provide damping means in addition to the tip shroud damper for damping modes of vibration for which the tip shroud damper is not optimized.

These and other objects are realized in accordance with the invention by providing each rotor blade with a damping member comprising a shaft and a contact head connected to an end of the shaft. The shaft is slidably arranged in a recess of a member installed in the platform portion of the rotor blade. The installed member can, for example, be a tube brazed into a hole bored in the platform or a block with a bore brazed to the platform.

During rotation of the rotor disk, the shaft of the damping member slides, in contact with corresponding guide means defining the recess, along the shaft axis, whereby the damping member is moved from a first position to a second position by the centrifugal forces acting thereon. The contact head of the damping member of each rotor blade bears against a surface of the platform portion of the corresponding adjacent rotor blade when the damping member is located at the second position. The force exerted on the adjacent platform by the contact head during vibratory motion in the rotor blade serves to damp that vibration.

One advantage of the improved damper arrangement over prior art dampers is that it can be precisely located to damp vibratory motion at a specific location where vibration is greatest.

Another advantage of the invention is that it supplies relatively high damper force in a power turbine where rotational speeds are low: typically 4000 rpm or less.

A further advantage is that the improved damper of the invention is inexpensive to manufacture and can be easily reworked into existing hardware.

BRIEF DESCRIPTION OF THE DRAWINGS

These and other advantages of the invention will be better understood when the detailed description of the preferred embodiment of the invention is read in conjunction with the drawings, wherein.

DETAILED DESCRIPTION OF THE PREFERRED EMBODIMENTS

Figure 1A:
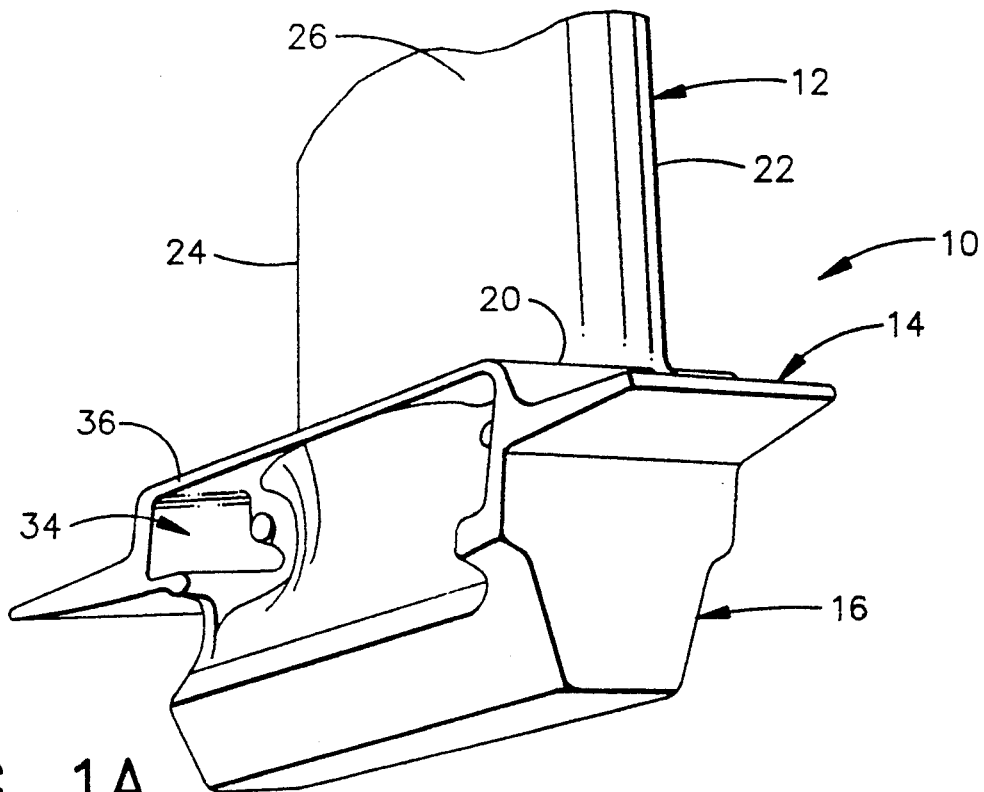
FIGS. 1A through 1C are perspective views of a portion of conventional rotor blades respectively without retrofitting and retrofitted in accordance with first and second preferred embodiments of the invention.

With the exception of the retrofitted damping means of the invention, the structure of the improved rotor blade disclosed herein is substantially the same as that of the conventional rotor blade depicted in FIG. 1A. Each rotor blade has an airfoil portion 12, a platform portion 14 and a root or dovetail portion 16 (shown in its as cast condition without machining).

Figure 6:
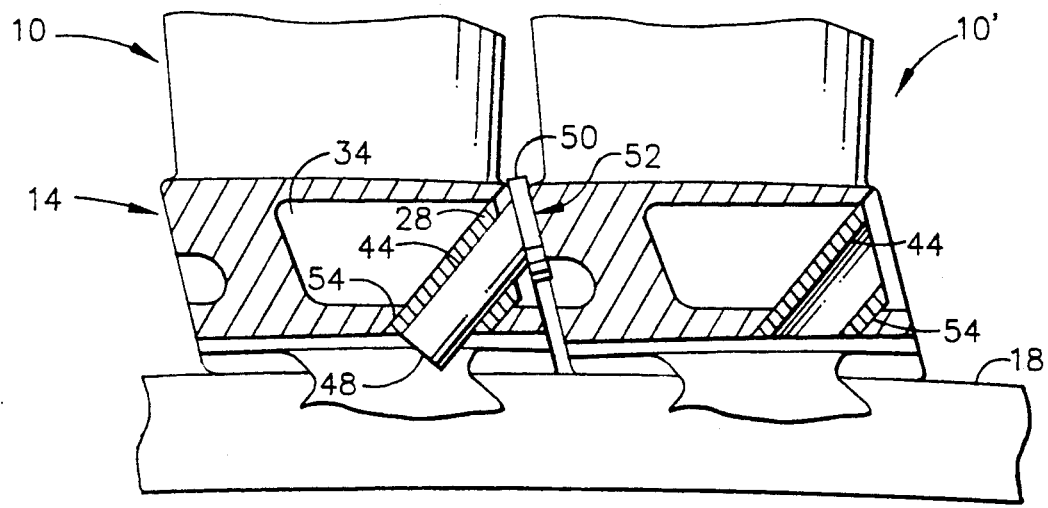
FIG. 6 is a partially sectional rear view of adjacent rotor blades with the platforms sectioned along line A—A as indicated in FIG. 2.

A plurality of such rotor blades are circumferentially distributed on the periphery of a rotor disk 18, of which a fragmentary portion is generally indicated at 18 in FIG. 6. The root or dovetail portion 16 of each rotor blade slides into a complementarily configured axially disposed recess in the disk, thereby securing the rotor blade to the disk.

The airfoils extend radially outwardly into an annular flow passageway (not shown) defined between radially outwardly facing cylindrically segmented surfaces 20 of the platforms 14 and a radially inwardly facing surface (not shown) of a tip shroud. The rotor is journalled for rotation about a horizontal axis (not shown) such that the airfoils rotate in the annular flow passageway in response to axial flow of gas from a combustor (not shown) through the passageway. Each airfoil has a rounded leading edge 22 directed toward the gas flow, a trailing edge 24, a convex suction surface 26 and a concave pressure surface (not shown).

The entire rotor blade is preferably and integrally formed cast-and-machined member. Hence the airfoil extends radially outwardly from platform radially outer surface 20 to the tip shrouds (not shown). When exposed to the gas flow, the airfoil is subjected to both flexural and torsional stresses.

Figure 1B:
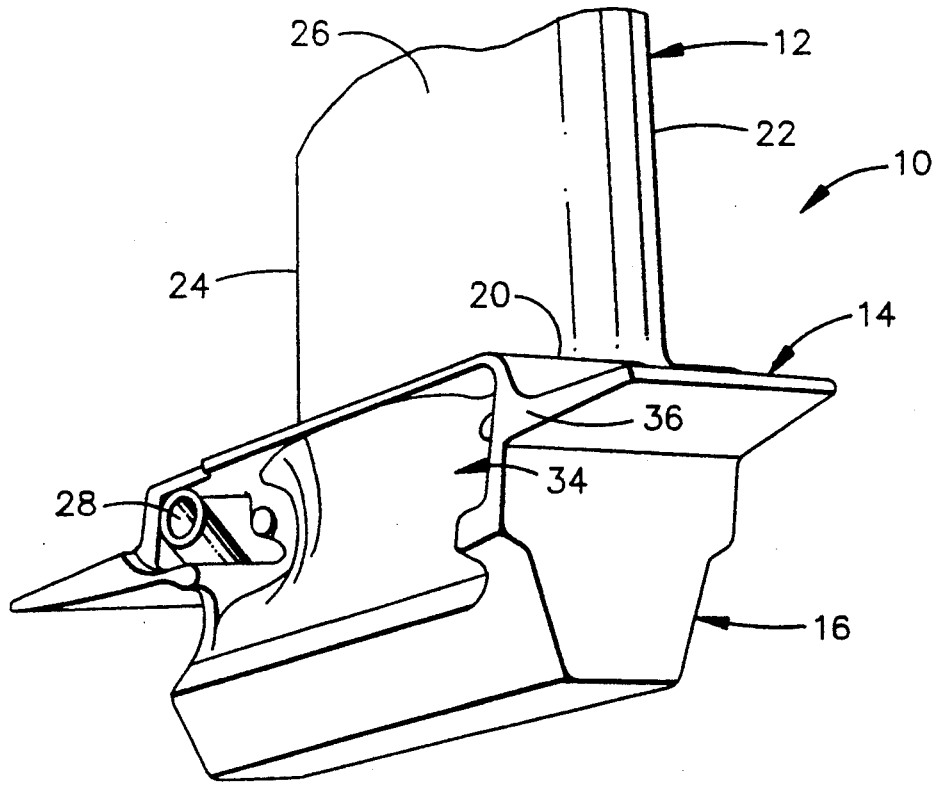
Figure 1C:
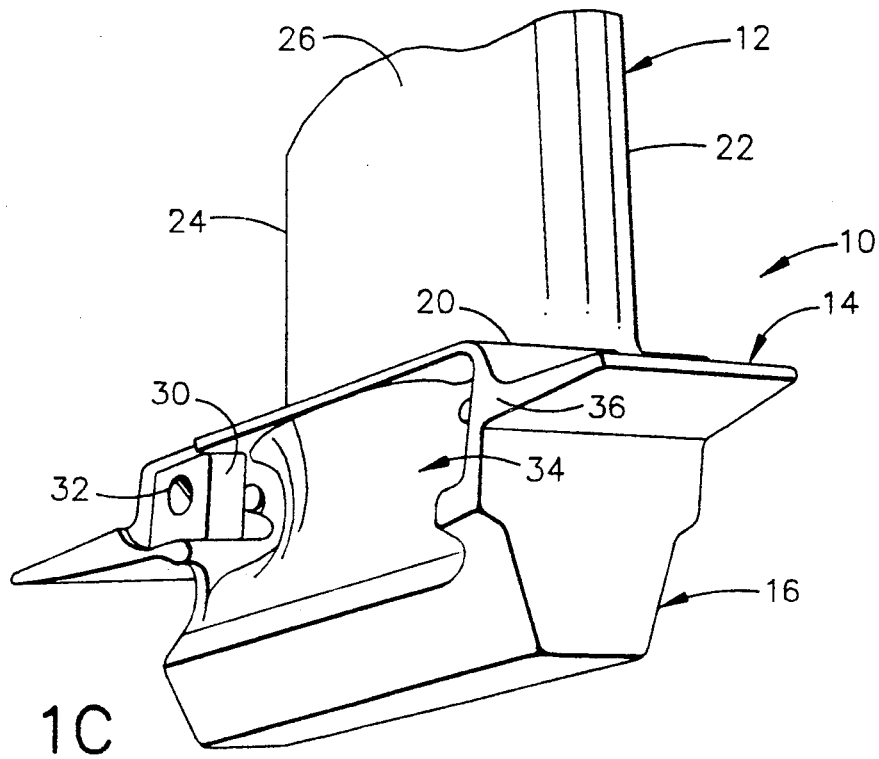

In accordance with the invention, a conventional rotor blade can be retrofitted to incorporate a tube 28 (FIG. 1B) or a block 30 with a bore 32 (FIG. 1C) for receiving a member for damping vibrations to be described in detail below. Alternatively, the damping member can be incorporated into the design of new rotor blades, for example, by boring a hole into a solid portion of the platform.

Figure 2:
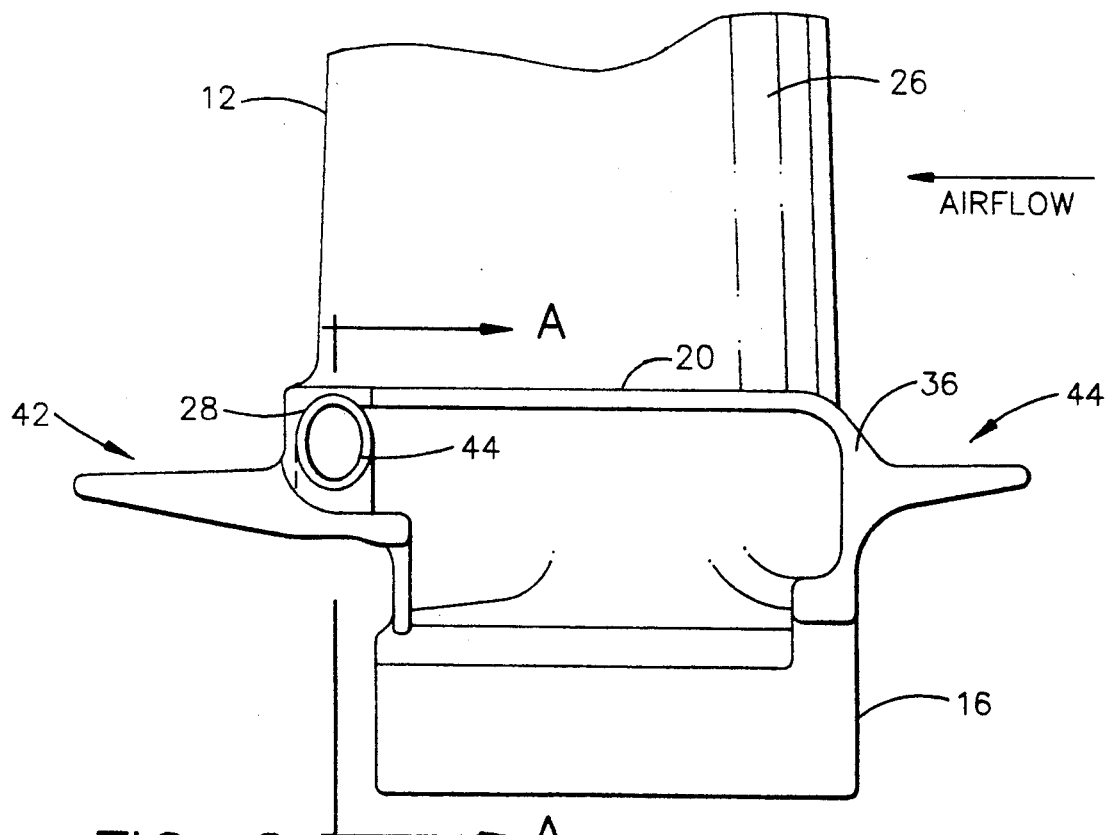
FIG. 2 is a side elevational view of the first preferred embodiment of the invention showing the lagging side surface of the platform.
Figure 3:
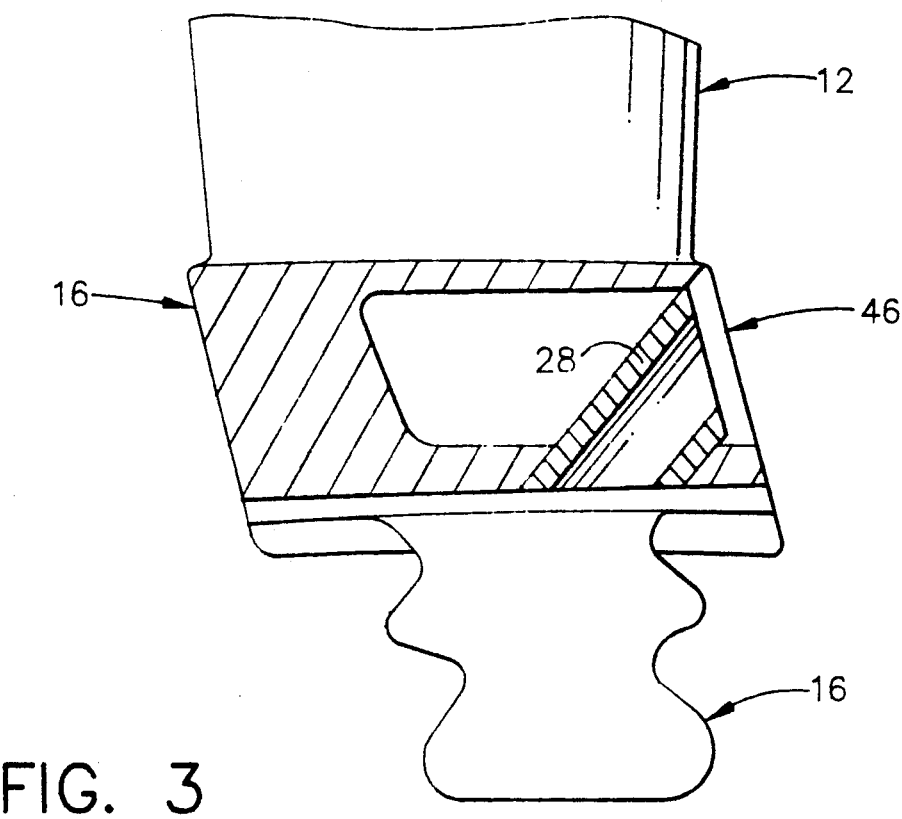
FIG. 3 is a partially sectional rear view of the first preferred embodiment of the invention with the platform sectioned along line A—A indicated in FIG. 2.
Figure 4:
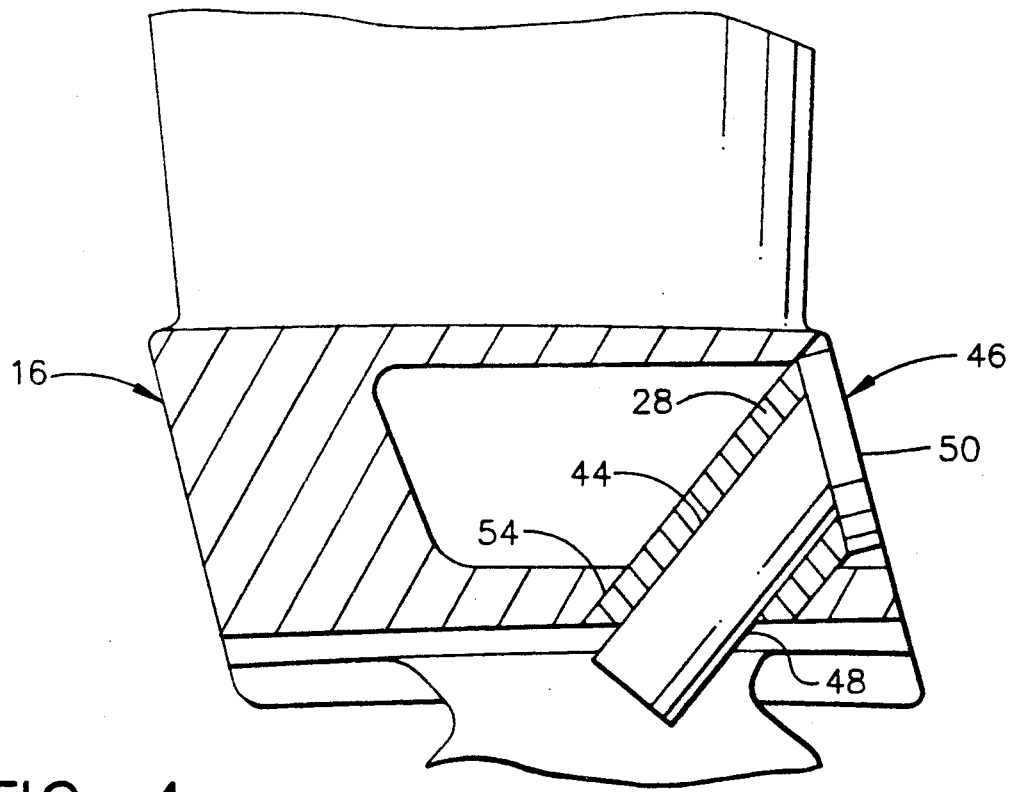
FIG. 4 is an enlarged view of a portion of the structure shown in FIG. 3.

The platform of the improved rotor blade is generally a solid body having a recess 34 and a lagging side surface 36 on the suction side (see FIGS. 1B and 1C), a recess 56 and a leading side surface 52 (see FIG. 7) on the pressure side, a forward extension 40 and a rearward extension 42 (see FIG. 2). The forward and rearward extensions 40 and 42 are generally slightly rounded segmented members having surface of revolution generated about the axis of the rotor disk.

During rotation of the rotor, torsional vibrations occur which should be damped by a suitable damping device. In accordance with the invention, a damping device is incorporated in the platform portion of each rotor blade. In accordance with the preferred embodiment, the damping device is located at a position such that it damps torsional vibration during rotation, which torsional vibration occurs in the form of radial motion of the rear edge of the platform on the pressure side.

In accordance with the first and second preferred embodiments (FIGS. 1B and 1C), a conventional rotor blade is retrofitted with the invention. The details of the structure of the first preferred embodiment are shown in FIGS. 2-4, 5A and 5B.

The first step in the retrofitting in accordance with the first embodiment is to bore a cylindrical throughhole 54 (FIG. 4) in the platform on the lagging side thereof. Hole 54 is disposed such that its longitudinal axis substantially lies in a radial plane at a nonrectilinear angle relative to the radial axis of the rotor blade.

The next step in the retrofitting is to insert into hole 54 one end of a cylindrical tube 28 having a cross section which conforms to the cross section of hole 54. The inserted end is secured inside hole 54 by brazing. Although the cross sections of bore 54 and tube 58 can have any shape as long as the shapes are conforming, preferably the cross sections are circular for ease of manufacture. The tube 28 extends beyond the hole 54, the end face of the tube lying substantially in a radial plane defined by lagging side surface 36. The outer circumferential surface of the exposed end of tube 28 may bear against adjacent surfaces of the platform for additional support and may even be brazed thereto. Tube 28 has a cylindrical bore 44 for slidably receiving the damping element 46 (see FIG. 5A).

In accordance with the second preferred embodiment (FIG. 1C), a block 30 is inserted in recess 34 of the platform and brazed to adjacent surfaces of the platform. Block 30 has cylindrical bore 32 bored therein which is disposed at the same angular position as bore 44 of tube 28 for receiving the damping element.

Figure 5A:
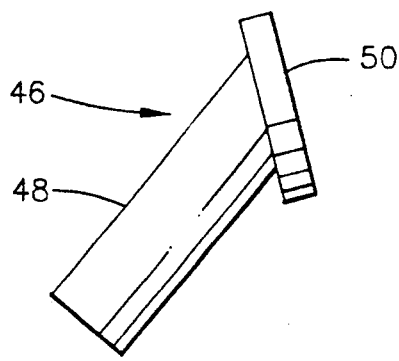
FIGS. 5A and 5B are side and front views respectively of the damping member in accordance with the first preferred embodiment of the invention.
Figure 5B:
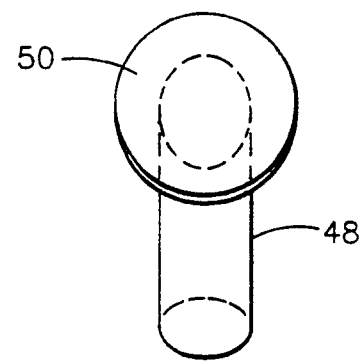

As best seen in FIGS. 5A and 5B, the damping element 46 has a cylindrical shaft 48 and a disk-like contact head 50 integrally connected thereto. Contact head 50 is disposed such that its axis is not parallel to the axis of shaft 48. Shaft 48 has a cross section such that it can be slidably inserted inside bore 44 of tube 28, the surface of bore 44 serving to guide shaft 48 to allow displacement only along the longitudinal axis of tube 28.

The length and diameter of shaft 48 can be varied as necessary for mass adjustment. In particular, the length of the shaft may be such that the end of the shaft extends into the free space located radially inside of the platform portion and axially to the rear of the dovetail 16.

The shaft 48 can be waxed to hold it in place inside bore 44 during assembly. During operation, this wax will naturally melt at the high temperature inside the turbine.

Preferably means are provided to prevent rotation of damping element 46 about its longitudinal axis. For example, if the cross sections of hole 44 in tube 28 and shaft 48 have conforming non-circular shapes, rotation will be prevented. Alternatively, the cross sections of hole 44 in tube 28 and shaft 48 need not be conforming. For example, hole 44 can be provided with a plurality of circumferentially distributed longitudinal protrusions which ride in corresponding grooves formed in shaft 48 or vice versa.

The end of tube 28 is angled at the same angle as the contact head 50 to provide a seat therefor when the damping element 46 is in its fully retracted position.

During rotation of the rotor, the damping element 46 of rotor blade 10 is urged to slide outwardly by the centrifugal forces exerted thereon. The material of tube 28 need not be the same material as that of the rotor blade and can be selected to reduce the level of wear between the tube and shaft of the damping element during longitudinal sliding. The damping element 46 slides outwardly until the contact head 50 abuts the platform of the adjacent rotor blade 10', as shown in FIG. 6.

Figure 7:
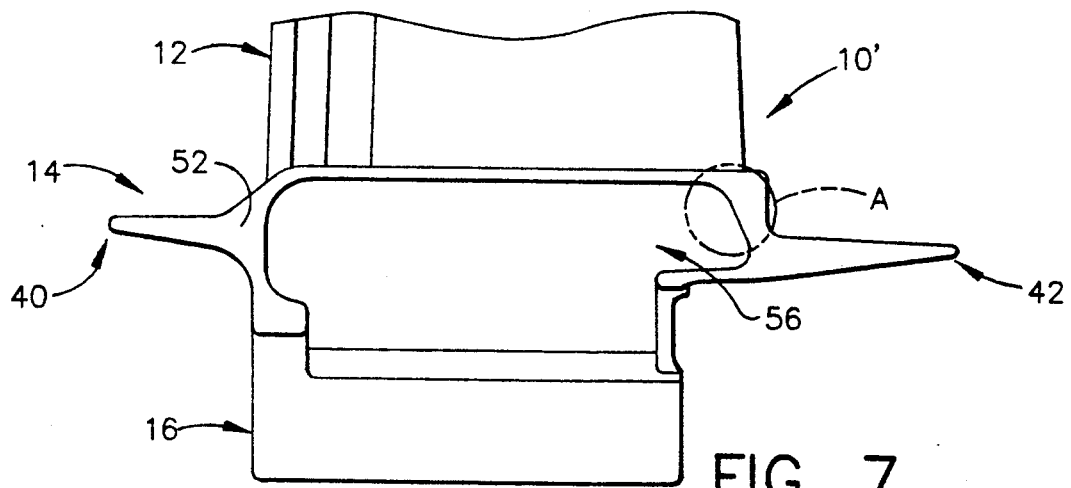
FIG. 7 is a side elevational view showing the leading side surface of the platform.

The area of contact between the contact head 50 and the leading side surface 52 of the platform of adjacent rotor blade 10' is indicated by the dashed circular line labeled A in FIG. 7. The damping element 46 adjusts automatically under centrifugal loading to bear against the adjacent platform despite variations in the width of the gap between platforms.

During this engagement, the damping element 46 of rotor blade 10 resists circumferential motion of the platform of adjacent rotor blade 10' in the direction of rotation because shaft 48 is constrained by bore 44 of tube 28 against rotation in the radial plane. Similarly, the damping member (not shown) of rotor blade 10', which bears against the leading side surface of the platform of the next adjacent rotor blade, will resist circumferential motion of the platform of rotor blade 10' in a direction opposite to the direction of rotation. The blade-to-blade friction scrubbing action due to this forced engagement damps vibratory motion in the radial and axial directions of the platforms of both rotor blades 10 and 10'. Each pair of adjacent rotor blades are similarly coupled.

The preferred embodiment has been described in detail hereinabove for the purpose of illustration only. It will be apparent to a practitioner of ordinary skill in the art of gas turbine engines that various modifications could be made to the above-described structure without departing from the spirit and scope of the invention as defined in the claims set forth hereinafter.

For example, preferred embodiments have been described wherein the damping device is located at a position such that it damps torsional vibration in the form of radial motion of the rear edge of the platform on the pressure side during rotation. However, it will be obvious to practitioners of ordinary skill in the art of gas turbine engines that the damping device of the present invention could be located at other positions such that it damps undesirable vibratory motion occurring at other portions of the platform.

In addition, if desired, the recess for receiving the damping element could extend into the platform from the leading side thereof and the damping member could be arranged to move outwardly along the wall of the recess to engage the opposing lagging side surface of the adjacent blade. Whether the recess extends into the platform from the leading or lagging side thereof depends in large part on the physical configuration of the blade and manufacturing convenience.

We claim:

1. A rotor blade for a rotor of an engine, comprising a root portion, a platform portion connected to said root portion, an airfoil portion connected to said platform portion, a damping member comprising a shaft having an axis oriented transverse to the radial axis of said airfoil portion and a contact head having an area greater than the cross-sectional area of said shaft connected to an end of said shaft, and means for guiding said shaft of said damping member for slidable displacement along said shaft axis only, said shaft guiding means being arranged in said platform portion.

2. The rotor blade for a rotor of an engine as defined in claim 1, wherein said shaft guiding means comprises a cylindrical tube mounted in a bore formed in said platform portion.

3. The rotor blade for a rotor of an engine as defined in claim 1, wherein said shaft guiding means comprises a cylindrical bore formed in a block secured in a recess in said platform portion.

4. The rotor blade for a rotor of an engine as defined in claim 1, wherein said shaft axis is inclined at an angle relative to a radial axis of said airfoil portion which is less than a right angle.

5. The rotor blade for a rotor of an engine as defined in claim 1, wherein said contact head is inclined at an angle relative to said shaft axis which is not equal to 90 degrees.

6. The rotor blade for a rotor of an engine as defined in claim 1, wherein said shaft is cylindrical and said contact head is disk-shaped.

7. A rotor assembly for an engine comprising:
 a rotor disk comprising first and second means for receiving a root portion of a rotor blade arranged on the outer circumference of said rotor disk;
 first and second rotor blades each comprising a root portion, a platform portion connected to said root portion, and an airfoil portion connected to said platform portion; and
 means for rotatably supporting said rotor disk for rotation about an axis,
 wherein said first rotor blade further comprises a damping member comprising a shaft having an axis and a contact head connected to an end of said shaft, and means for guiding said shaft of said damping member for slidable displacement along said shaft axis only, said shaft guiding means being arranged in said platform portion; and wherein during rotation of said rotor disk, the shaft of the damping member of said first rotor blade slides, in contact with its corresponding guide means, along said shaft axis, whereby said damping member is moved from a first position to a second position by the centrifugal forces acting thereon and said contact head of the damping member of said first rotor blade bears against a surface of the platform portion of said second rotor blade when said damping member is located at said second position to engage at any site along the length of said second rotor blade platform to damp vibrational forces locally.

8. The rotor assembly for an engine as defined in claim 7, wherein said shaft guiding means comprises a cylindrical tube mounted in a bore formed in said platform portion of said first rotor blade and wherein said tube is formed of a low alloy nickel based material.

9. The rotor assembly for an engine as defined in claim 7, wherein said shaft guiding means comprises a cylindrical bore formed in a block secured in a recess in said platform portion of said first rotor blade and wherein said bore is formed of a low alloy nickel based material.

10. The rotor assembly for an engine as defined in claim 7, wherein said shaft axis is inclined at an angle relative to a radial axis of said airfoil portion of said first rotor blade which is less than a right angle.

11. The rotor assembly for an engine as defined in claim 7, wherein said contact head is inclined at an angle relative to said shaft axis which is not equal to 90 degrees.

12. The rotor assembly for an engine as defined in claim 7, wherein said shaft is cylindrical and said contact head is disk-shaped and wherein said shaft and said contact head are formed of a low alloy nickel based material.

13. The rotor assembly for an engine as defined in claim 7, wherein said contact head is displaced in at least the radial and circumferential directions as said damping member is moved from said first position to said second position.

14. A method of retrofitting a rotor blade for a rotor of an engine, said rotor blade comprising a root portion, a platform portion connected to said root portion, an airfoil portion connected to said platform portion: comprising the steps of:
forming a damping element comprising a shaft having an axis and a contact head connected to an end of said shaft;
installing a means for guiding said shaft of said damping element in said platform portion; and
slidably inserting said shaft of said damping element in said shaft guiding means,
wherein said damping element is slidably displaceable along said shaft axis only.

15. The method of retrofitting a rotor blade as defined in claim 14, wherein said shaft guiding means comprises a cylindrical tube mounted in a bore formed in said platform portion.

16. The method of retrofitting a rotor blade as defined in claim 14, wherein said shaft guiding means comprises a cylindrical bore formed in a block secured in a recess in said platform portion.

17. The method of retrofitting a rotor blade as defined in claim 14, wherein said shaft axis is inclined at an angle relative to a radial axis of said airfoil portion which is less than a right angle.

18. The method of retrofitting a rotor blade as defined in claim 14, wherein said contact head is inclined at an angle relative to said shaft axis which is not equal to 90 degrees.

19. The method of retrofitting a rotor blade as defined in claim 14, wherein said shaft is cylindrical and said contact head is disk-shaped.

* * * * *